(12) United States Patent
Warning

(10) Patent No.: US 6,772,793 B2
(45) Date of Patent: Aug. 10, 2004

(54) RECREATIONAL VEHICLE FAUCET

(75) Inventor: Anthony Warning, Elkhart, IN (US)

(73) Assignee: D & W Incorporated, Elkhart, IN (US)

( * ) Notice: Subject to any disclaimer, the term of this patent is extended or adjusted under 35 U.S.C. 154(b) by 63 days.

(21) Appl. No.: 10/120,798

(22) Filed: Apr. 11, 2002

(65) Prior Publication Data

US 2003/0192592 A1 Oct. 16, 2003

(51) Int. Cl.[7] .............................. F16L 3/00; B65H 75/34
(52) U.S. Cl. ............. 137/899; 137/355.12; 137/355.16; 137/355.28
(58) Field of Search ....................... 137/355.12, 355.16, 137/899, 355.28

(56) References Cited

U.S. PATENT DOCUMENTS

| | | | |
|---|---|---|---|
| 2,780,430 A | * | 2/1957 | Pokryfke |
| 3,749,118 A | * | 7/1973 | Berg ..................... 137/355.28 |
| 3,774,630 A | * | 11/1973 | Prange .................. 137/355.12 |
| 5,800,002 A | | 9/1998 | Tiedge et al. |
| 6,186,166 B1 | * | 2/2001 | Myers ................... 137/355.16 |

OTHER PUBLICATIONS

Brochure, "SuperCoil. It's a Snap to use from Deck to Dock, Grass to Garden", SuperCoil System, undated, 2 pages, 2001.
Brochure, "HoseCoil: The hose that puts itself away", Ocean Equipment, Inc., undated, 1 page1.

* cited by examiner

*Primary Examiner*—A. Michael Chambers
(74) *Attorney, Agent, or Firm*—Baker & Daniels

(57) ABSTRACT

A recreational vehicle faucet accessible from outside the vehicle includes a housing having an inlet fitting connected to the fresh water supply. An outlet fitting and valve is provided in the housing interior for delivery of fresh water to the exterior of the vehicle through a hose connected to the valve. The housing includes a cover to close the housing interior and a mounting flange for mounting the housing to the vehicle side wall. In one embodiment of the invention, the housing provides a storage compartment for the hose.

13 Claims, 7 Drawing Sheets

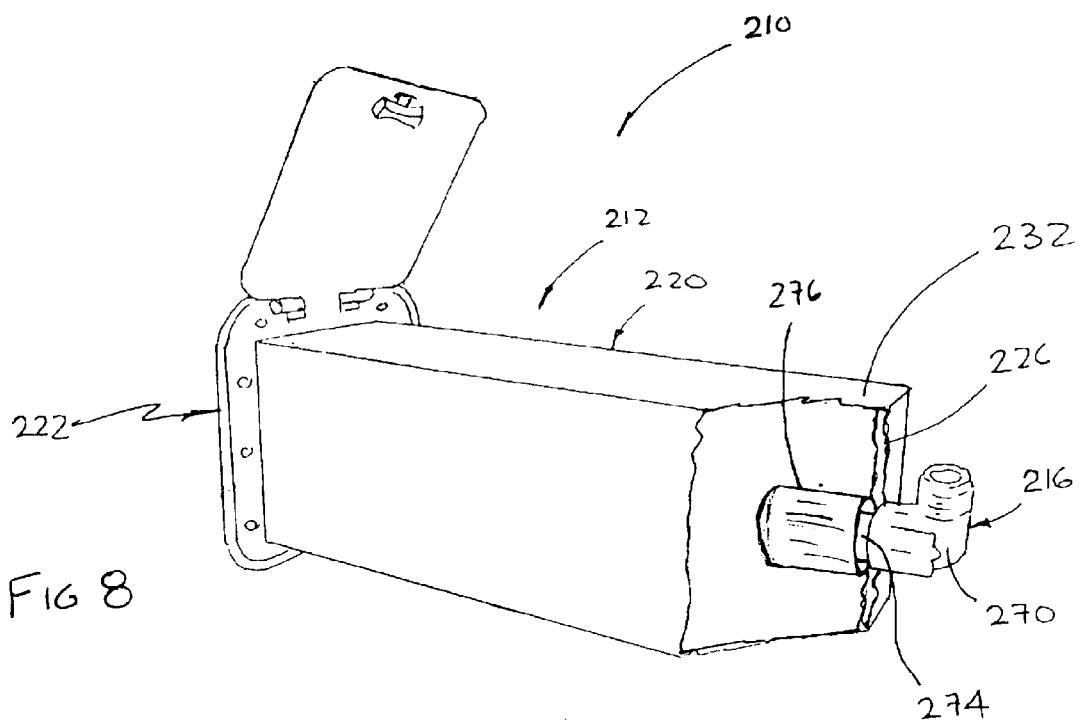
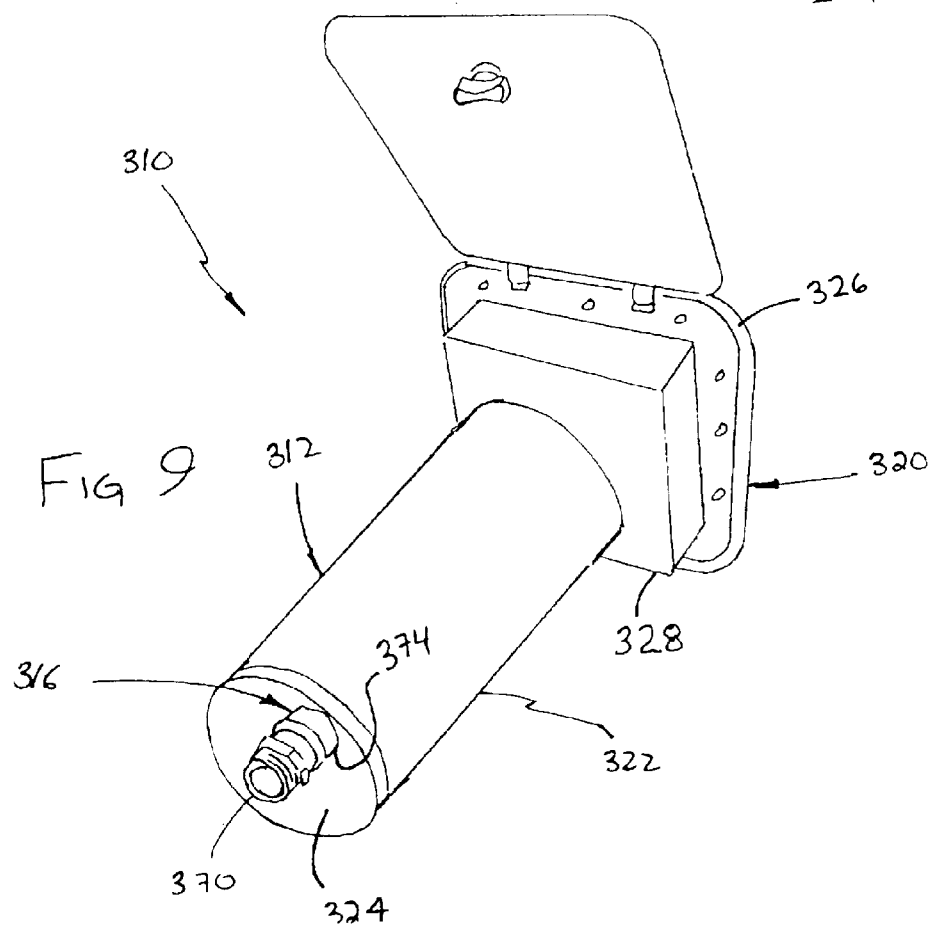

RECREATIONAL VEHICLE FAUCET

BACKGROUND OF THE INVENTION

This invention relates generally to accessories for recreational vehicles and particularly to an outside faucet assembly for a recreational vehicle.

Various types of vehicles are used and sold for recreational purposes and commercial purposes. When referred to herein, recreational vehicles or commercial vehicles shall refer to motor homes, travel trailers, campers and the like, as well as water craft, such as pleasure boats and pontoons. For example, a typical recreational vehicle is shown in U.S. Pat. No. 5,800,002, which is a motor driven style motor home having an interior living area defined by outer walls, including side walls along both sides. Recreational vehicles (RV's) and marine craft carry a supply of fresh water for the convenience of the vehicle occupants while using the vehicle. In addition to internal uses, the user may also require fresh water outside the vehicle for such activities as washing or rinsing the vehicle exterior or washing or rinsing bicycles, scooters or trailered off-road vehicles such as all-terrain vehicles (ATV's) or motorcycles and the like. Depending on the activity being engaged in, the user himself or herself may want to wash his or her hands or rinse off gear, apparel, tools or equipment before re-entering the vehicle. In addition, trailered boats and watercraft benefit from a fresh water rinse after use.

Typically the user must locate a source of fresh water which often requires that the user drive or trailer the equipment or accessory to a location providing fresh water. In addition to being inconvenient, this allows dirt, foreign matter, or contaminants to dry or otherwise set on the items leaving undesirable deposits that become harder to remove at a later time. This can be particularly troublesome when exposure to salt water or corrosive materials is involved or where immediate fresh water flushing of the accessory after use is recommended.

Accordingly, a need exists for an apparatus that allows the user convenient access to the on-board fresh water supply while outside the vehicle.

SUMMARY OF THE INVENTION

The present invention provides a faucet assembly that includes a housing having an inlet fitting on the housing exterior that is connectable to a fluid source. An outlet fitting is mounted inside the housing. A valve attached to the outlet fitting controls fluid flow. In a preferred embodiment, the valve can be a quick connect coupling. The apparatus includes a hose connectable to the valve at one end and having a spray nozzle at the other end. In one embodiment of the invention, the housing has sufficient interior space to provide a compartment to store the hose and nozzle. A cover is provided to close the compartment when not in use.

The apparatus can be used with a recreational vehicle to provide an outside water faucet. In such installations, the housing can be mounted in an aperture in a side wall of the vehicle. Preferably, the housing includes a flange at the exterior end. The flange includes a plurality of mounting holes to mount the housing to the vehicle side wall.

DESCRIPTION OF THE FIGURES

FIG. 8 is a perspective view similar to that of FIG. 2, showing another embodiment of the invention; and FIG. 9 is a further perspective view similar to that of FIG. 2, showing another embodiment of the invention.

DESCRIPTION OF THE PREFERRED EMBODIMENTS

Figure 1:
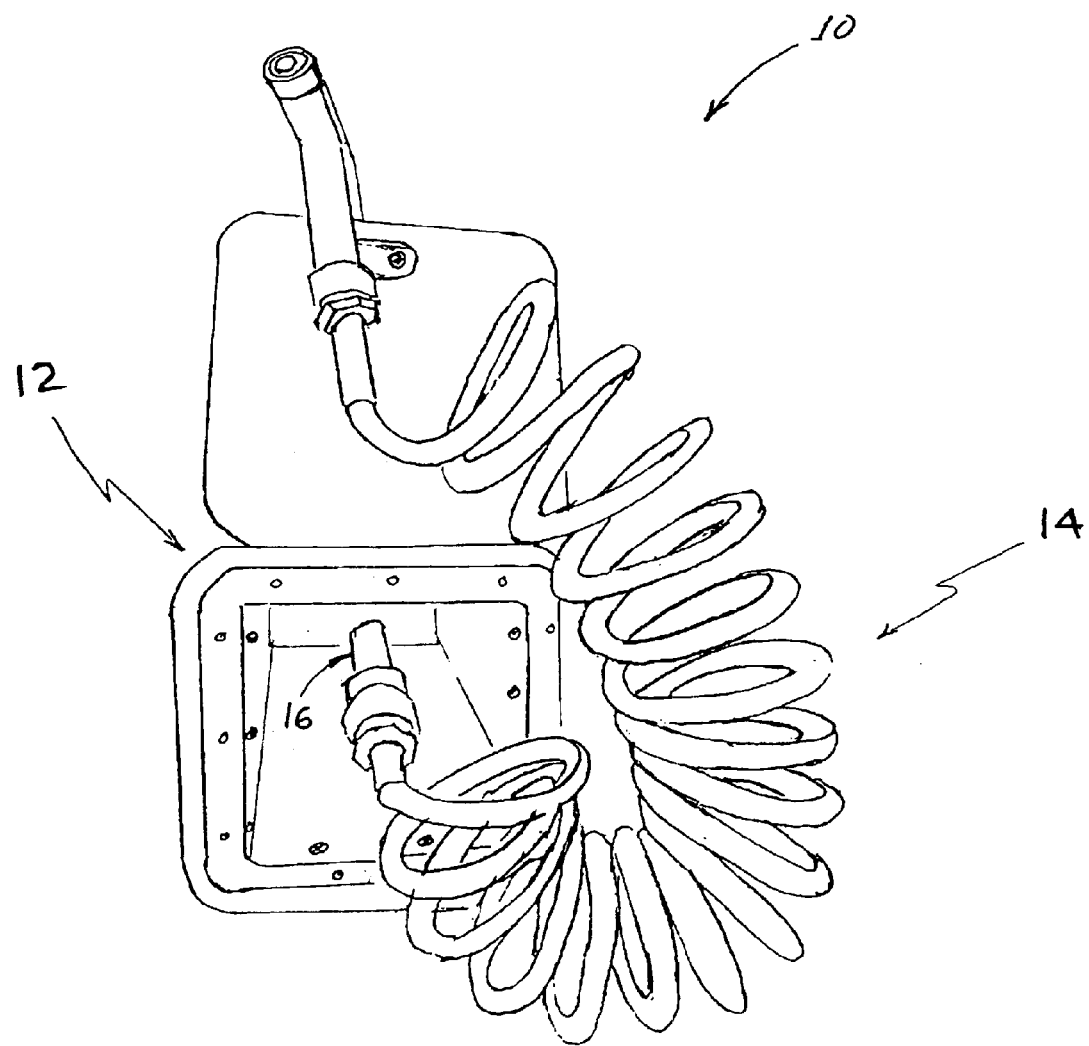
FIG. 1 is a front elevational view of the faucet assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
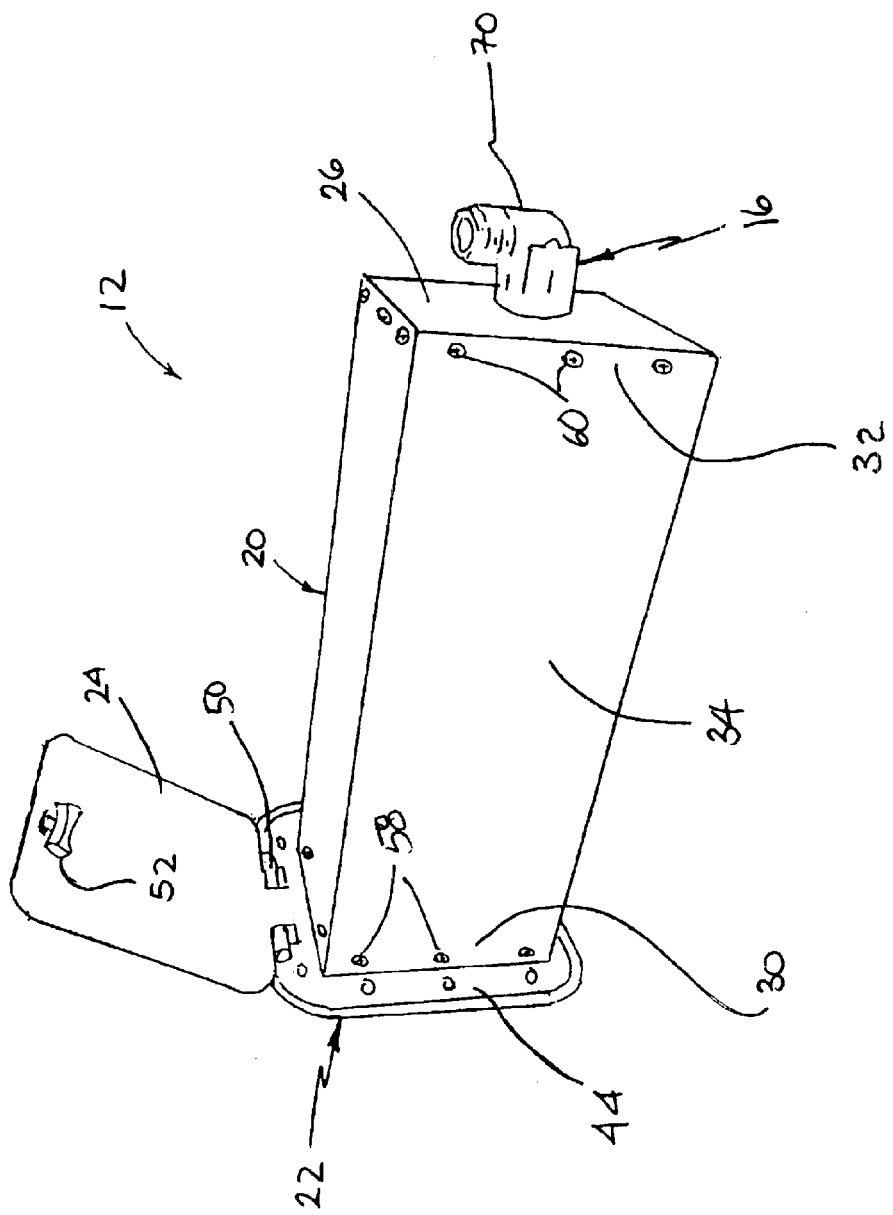
FIG. 2 is a perspective view of the faucet housing assembly.

Referring to FIG. 1, a first embodiment of the invention is shown as an outside recreational vehicle faucet assembly generally indicated by the numeral 10. The assembly 10 includes a housing assembly 12 and a hose assembly 14 coupled to fluid supply line 16. With reference now to FIG. 2, the housing 12 will be described in greater detail.

Figure 3:
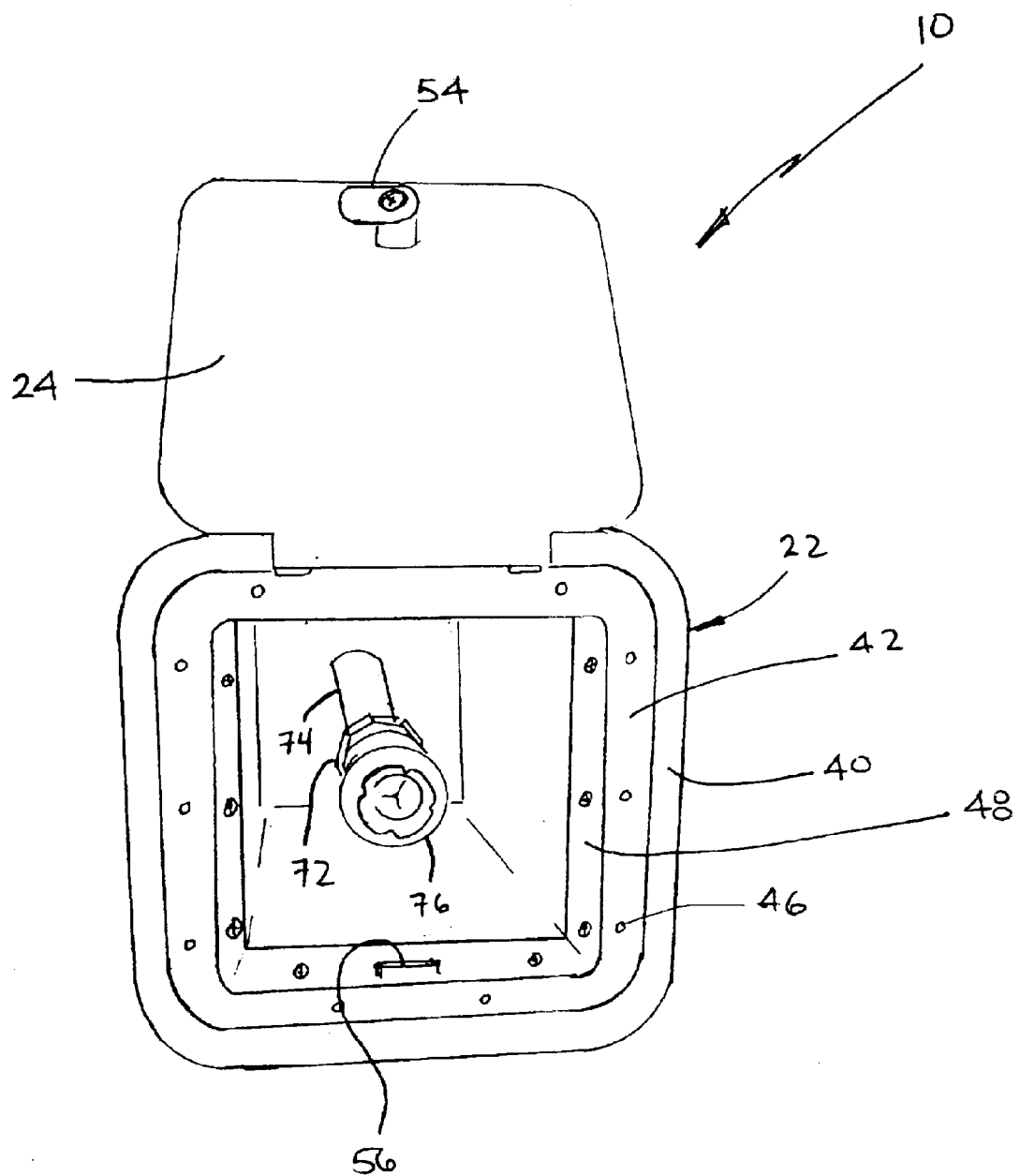
FIG. 3 is a front elevational view of the housing assembly of the faucet of FIG. 1 with the hose assembly removed.

The housing assembly 12 includes a housing body 20, a mounting flange 22, and a cover 24 hinged to the flange 22, and rear panel 26. Rear panel 26 encloses the housing body 20, and provides entry for fluid supply line 16, through a check valve (not shown) to prevent water from being drawn in from the hose. Housing body 20 is a tubular member, having a front end 30 and a rear end 32, with a plurality of side walls 34. Flange 22 includes a front face portion 40, a recessed surface 42, a rear mounting face 44 where a plurality of mounting apertures 46 extend therebetween. Flange 22 also includes an inner tubular extension section 48, which is profiled for slidable receipt within housing body 20, as described more fully herein. With reference still to FIGS. 2 and 3, cover 24 is hinged to flange 22 at hinge 50, and further comprises a latch handle 52, which operates latch member 54, on an inside of cover 24. A counterpart latch boss 56 is shown which cooperates with latch member 54. In the embodiment shown in FIG. 2, the flange 22 is held to housing body 20 by way of a plurality of fasteners 58. Meanwhile, rear plate 26 is held to housing body 20, by way of a plurality of fasteners 60.

With respect now to FIGS. 2 and 3, fluid supply line 16 will be described in greater detail. Fluid supply line 16 comprises an inlet fitting 70 at one end and has an outlet fitting 72 attached at another end of supply pipe 74. A valve can be attached to the outlet fitting 72 to control fluid flow through the system. In one embodiment, the valve 76 is a quick connect coupling and stopper valve; however, any of various fluid control valves well known in the art can also be employed. In the preferred version, supply pipe 74 is a PVC-type tube, but it should be appreciated that any type tubing could be used.

Figure 4:
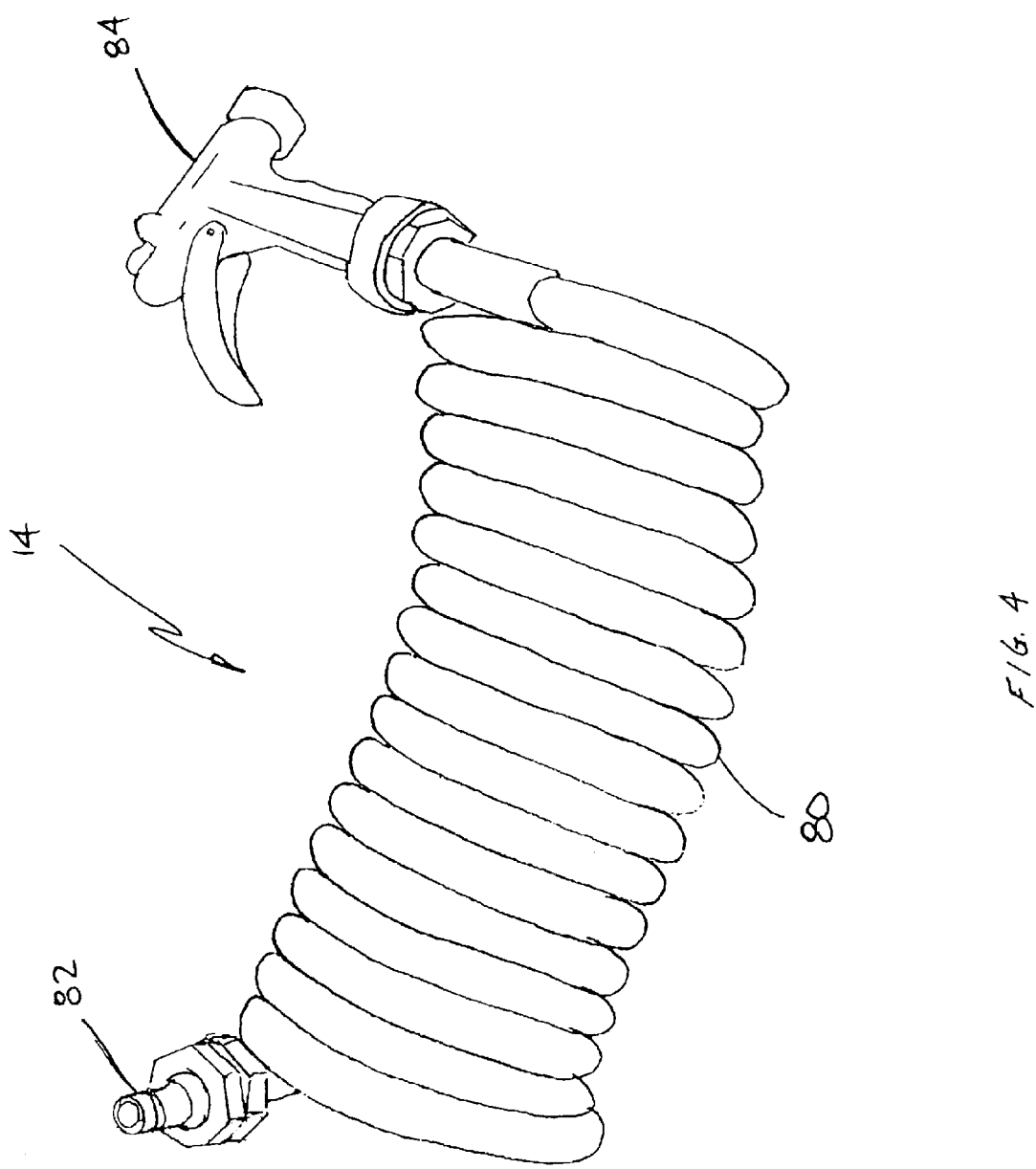
FIG. 4 is a detailed view showing the hose assembly.

With reference now to FIG. 4, hose assembly 14 is shown in greater detail. In the embodiment of FIG. 4, hose assembly 14 includes hose 80 shown with a male quick connect coupling 82 for use with the female coupling of valve 76, while a flow controlling nozzle 84 is shown at the other end. The hose 80 is shown pre-coiled and is shown as such for the purposes of illustration only, there being no intent to limit the invention. Again, the coupling and the nozzle are shown for the purpose of illustration and are not intended to limit the invention.

Figure 5:
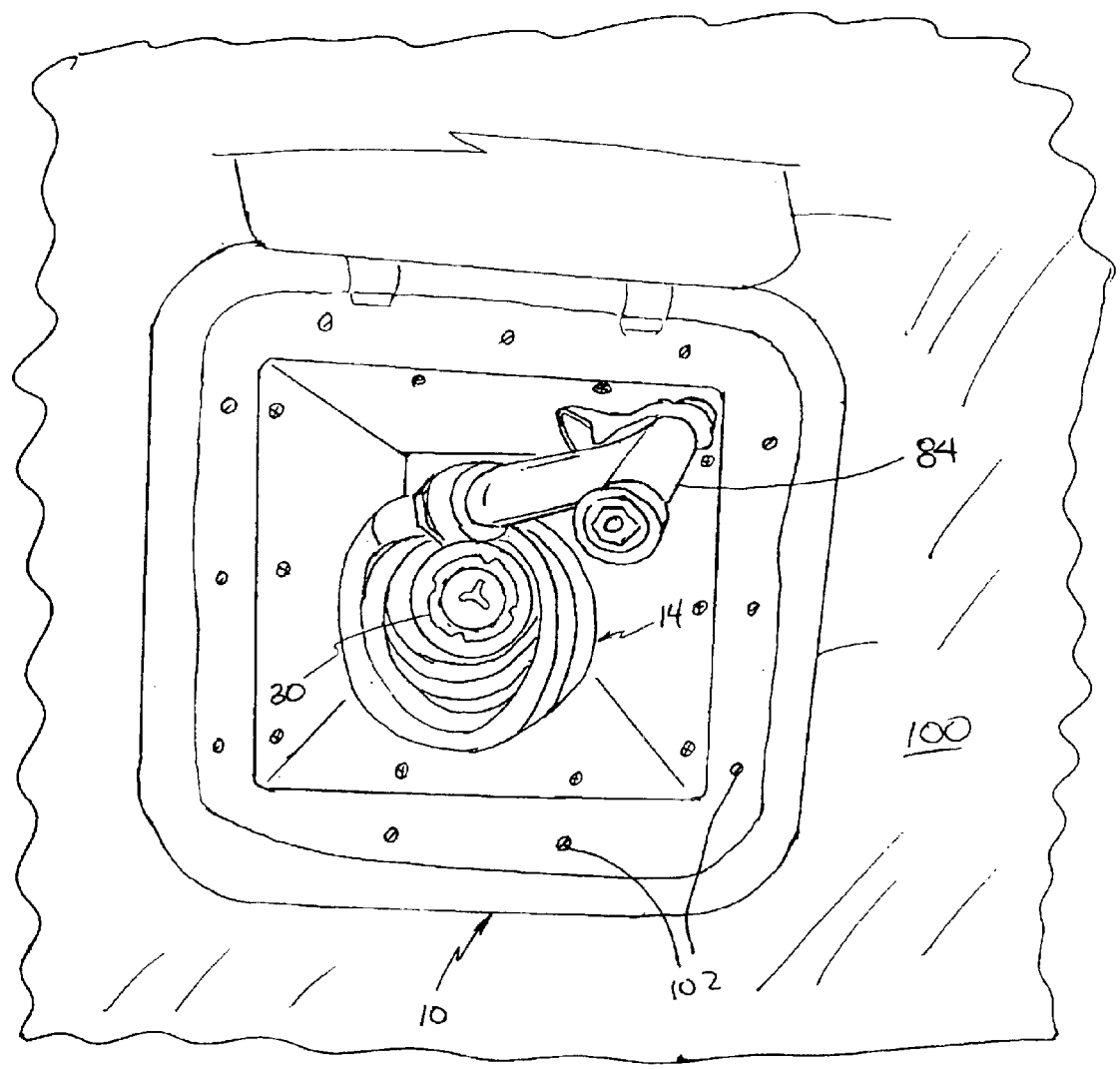
FIG. 5 is a front perspective view of the housing interior storing the hose assembly according to one embodiment of the present invention.

It should be appreciated that as assembled, the vehicle faucet assembly 10 could be mounted through a side wall of a recreational vehicle. The unit would be mounted through an opening in the side wall, with fasteners holding the assembly in place. With reference to FIG. 5, the unit 10 is shown mounted to the side wall 100 of a recreational vehicle. It should be appreciated that an aperture is cut through side wall 100, such that it is larger than the profile of body member 20, but smaller than the profile of flange 27. Fasteners 102 retain the assembly 10 in place to side wall 100. It should also be appreciated that fitting 70 is connected to the plumbing system of the vehicle, by way of a corresponding mating fitting (not shown) to supply water pressure to the supply line 16. It should also be appreciated that body member 20 is elongate, such that hose assembly may be stored in housing assembly 12, as shown in FIG. 5. When needed for use, the hose assembly 14 would be removed, and fittings 82, 72 would be connected to supply water pressure to hose assembly 14.

Figure 7:
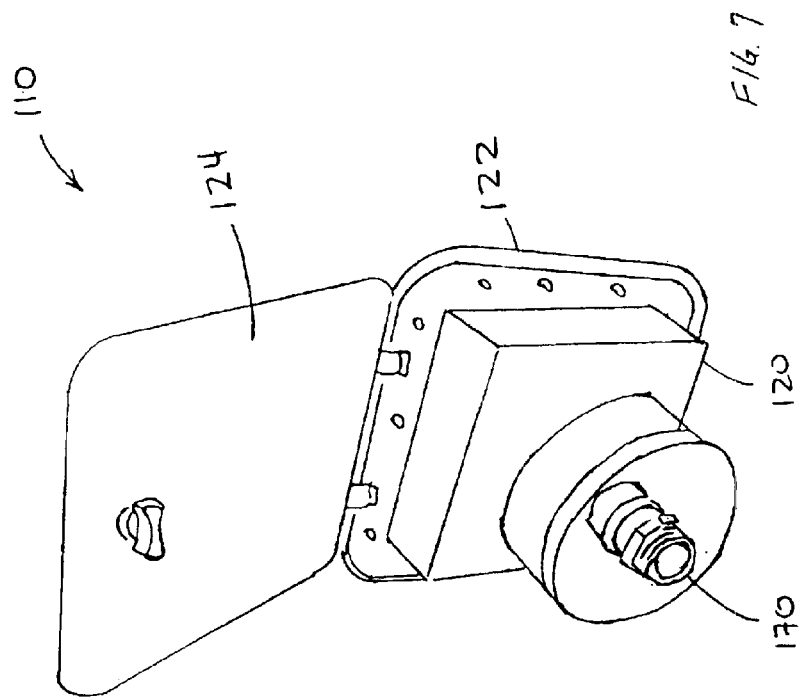
FIG. 7 is a rear perspective view of the housing of FIG. 6.
Figure 6:
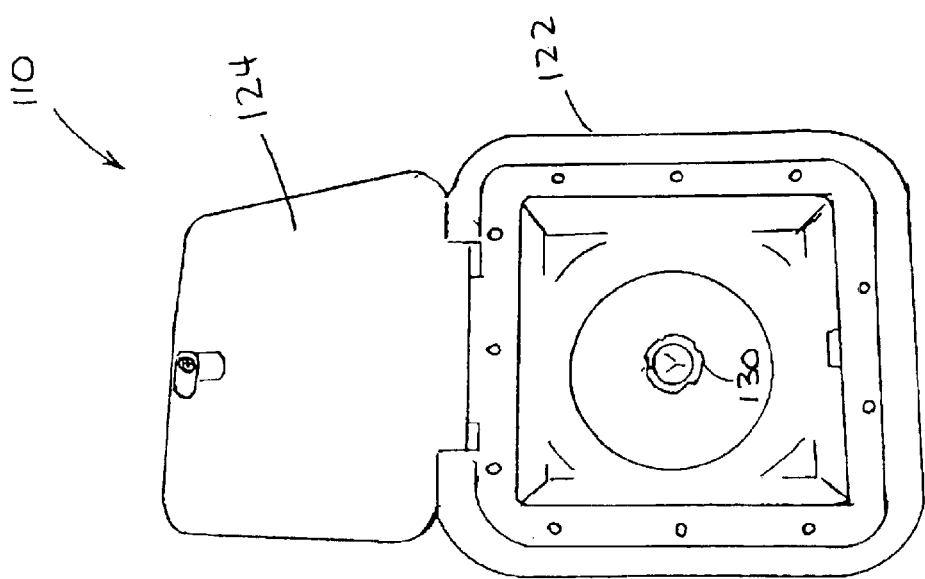
FIG. 6 is a front perspective view of housing assembly according to another embodiment of the present invention.

Front and rear views, respectively, of an auxiliary housing assembly 110 are shown in FIGS. 6 and 7. One or more housings 110 may be placed at other locations along the side walls of an RV, depending upon the size of the RV. This would allow the user to remove the stored hose assembly 14 from assembly 10 and use it with the housing assembly 110.

The faucet housing assembly 10 in FIGS. 6 and 7 is shortened and does not provide hose storage capability. The housing assembly 110 includes a housing body 120 which includes a cover 124 and mounting flange 122. A quick connect coupling 130 is provided at the outlet in the interior of the housing along with the rearward facing inlet fitting 170 exterior to the housing.

With reference now to FIG. 8, yet another embodiment of assembly is shown at 210. This embodiment is shown having a housing 212, where body section 220 is integrally molded with flange 222 and rear plate 226. The body portion 220 is shown partially broken away through rear end 232 and through rear plate 226 to show an alternate fluid supply line 216. This fluid supply line 216 includes an inlet fitting 270, supply pipe 274 and valve fitting 276. FIG. 8 still shows an elongate body portion 220 which could house the hose assembly 14. It should be appreciated that body section 220, integrally molded with flange 222 and rear plate 226, could also be used with fluid supply line 16, and likewise, a shortened fluid supply line 216 could be used with a housing body section described as member 20.

With reference now to FIG. 9, yet another embodiment of assembly is shown at 310. This embodiment is shown having a cylindrical housing body 312, a front housing portion 320, and a fluid supply line 316. Housing body 312 includes a cylindrical tube 322 adhesively fixed to front housing portion 320 and to a rear plate 324. As in other embodiments, front housing 320 includes a flange 326 and a rear rectangular section 328. Fluid supply line 316 includes an inlet fitting 370 connected to supply pipe 374 which extends inwardly of cylindrical tube 322 to terminate in a valve fitting, similar to those fittings described above. FIG. 9 still shows an elongate body portion 312 which could house the hose assembly 14.

Any of the faucets of the present invention would preferably be mounted in the side wall of a recreational vehicle below the main floor level so as to be easily connected to the fresh water storage tanks. One or more housings could be plumbed to the fresh water supply.

Other applications of the recreational vehicle faucet of the present invention are also contemplated. For instance, the faucet could be used in marine applications. Many boat trailers also provide storage tanks for fresh water, which is intended to be used to rinse the boat hull and to rinse the water cooling passages in the boat motor. In such an application, the faucet of the present invention could be mounted directly to the boat trailer and plumbed to the fresh water supply, thereby providing a convenient access to the fresh water supply for rinsing the boat hull and boat motor.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A vehicle comprising:
    vehicle side walls having at least one aperture therethrough;
    a water supply system;
    a housing received in said aperture in one of said side walls, said housing having an exterior end and an opposite interior end and defining an interior volume therebetween;
    an inlet fitting attached to said water supply system;
    an outlet fitting disposed within said interior volume of said housing and in fluid communication with said inlet fitting; and
    a valve coupled to said outlet fitting, operable between a first state enabling fluid flow and a second state inhibiting fluid flow.

2. The vehicle of claim 1, wherein said housing further includes a flange at said exterior end covering said aperture, said flange including a plurality of mounting holes, and a cover attached to said flange, said cover operable between a closed position preventing access to said interior volume and an opened position allowing access to said interior volume.

3. The vehicle of claim 1 further includes a hose, said hose having one end adapted to be connected to said valve.

4. The vehicle of claim 3, wherein said hose includes a nozzle connected to an end opposite said one end.

5. The vehicle of claim 3 wherein said housing is sized so that said hose and said nozzle are receivable within said interior volume for storage therein.

6. The vehicle of claim 5, wherein said hose is coiled, with a diameter of said coil being adapted for receipt within said housing.

7. The vehicle of claim 6, further comprising a fluid line which positions said outlet fitting adjacent to a front face of said housing.

8. The vehicle of claim 7, wherein said hose coil is receivable over said fluid line.

9. The vehicle of claim 1, wherein said valve is a quick connect coupling.

10. The vehicle of claim 1, further including a fluid line interconnecting said inlet fitting and said outlet fitting.

11. A plumbing apparatus for mounting in an aperture in a side wall of a vehicle comprising:

an elongate housing having first and second opposite ends and defining an interior volume therebetween, said elongate housing including a mounting flange attached thereto at said first end for mounting said flange of said housing around the periphery of the aperture with the housing received in the aperture, and said mounting flange including mounting apertures;

an inlet fitting attached to said housing and connectable to a fluid source external to said housing;

an outlet fitting disposed within said interior volume of said housing and in fluid communication with said inlet fitting;

a valve coupled to said outlet fitting, operable between a first state enabling fluid flow and a second state inhibiting fluid flow; and a hose assembly, receivable in said elongate housing for storage.

12. The plumbing apparatus of claim 11, further including a fluid line interconnecting said inlet fitting and said outlet fitting, and wherein said inlet fitting is mounted to said second end of said elongate housing, and said coiled around said fluid line.

13. The plumbing apparatus of claim 12, wherein said fluid line extends longitudinally through a central portion of said elongate housing.

* * * * *